US006499052B1

United States Patent
Hoang et al.

(10) Patent No.: US 6,499,052 B1
(45) Date of Patent: Dec. 24, 2002

(54) ELECTRONIC COMMERCE SYSTEM FOR REFERENCING REMOTE COMMERCE SITES AT A LOCAL COMMERCE SITE

(75) Inventors: Phu Hoang, San Francisco, CA (US); Qi Lu, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 09/372,350

(22) Filed: Aug. 11, 1999

(51) Int. Cl.$^7$ .......................... G06F 15/16; G06F 15/173
(52) U.S. Cl. ...................... 709/203; 709/201; 709/223; 709/227; 705/26
(58) Field of Search .......................... 705/26; 709/201, 709/203, 223, 227; G06F 17/60, 15/16, 15/173

(56) References Cited

U.S. PATENT DOCUMENTS 5,895,454 A    4/1999   Harrington
6,128,644 A   *   10/2000   Hideki

FOREIGN PATENT DOCUMENTS

WO    WO 200111485 A2 *   2/2001   .......... G06F/17/00

OTHER PUBLICATIONS

From http://www.davidreilley.com/java/, these pages contain FAQ by Java developer; containing book reviews, source code, tips & tricks.*
From http://www.javaskyline.com/learnservlets.html, containing organized set of resources for learning Java servlets on the Web, copyrighted Oct. 7, 1999.*
From http://www.esperanto.org.nz/jsp, containing frequently ask questions with answer on JSP by Richard Vowles, copyrighted Jan. 25, 1999.*
From http::WebDevelopersJournal.com/articles/into_ to_servlets.html, An introduction to Java servlets, copyrighted on Jan. 17, 1998.*
From http://www.javaskyline.com/dev.html, Java Server Front–end Development; copyrighted Oct. 7, 1999.*
From http://www.apl.jhu.edu/~hall/CWP.html, Core Web Programming; copyrighted Oct. 28, 1996.*
PGPub–Document–No.: 20010016878–Aug. 23, 2001, Commnicating system & method for controlling throughput.*

* cited by examiner

Primary Examiner—Cuong Nguyen
(74) Attorney, Agent, or Firm—Philip H. Albert; Townsend and Townsend and Crew LLP (57) ABSTRACT

According to the present invention, an electronic commerce method and system for referencing remote merchant sites at a local commerce site is provided. The local commerce site may also be a remote merchant integration server (RMIS). The remote commerce site may also be a remote merchant site. The remote merchant site may be a website of a merchant. In an exemplary embodiment of the present invention, the electronic commerce method and system for referencing remote merchant sites at a local commerce site includes the following: session managing a client request from a user client and a cookie stripped merchant response, where the session managing includes generating a processed remote merchant integration server (RMIS) response related to a merchant cookie and to the cookie stripped merchant response; traffic relaying the client request and a content transformed merchant response, where the traffic relaying includes generating a processed client request related to the client request, removing the merchant cookie from the content transformed merchant response, and generating the cookie stripped merchant response related to the content transformed merchant response; service integrating the processed client request; and content transforming a merchant response from the remote merchant site, where the content transforming includes generating the content transformed merchant response related to the merchant response.

20 Claims, 5 Drawing Sheets

ELECTRONIC COMMERCE SYSTEM FOR REFERENCING REMOTE COMMERCE SITES AT A LOCAL COMMERCE SITE

BACKGROUND OF THE INVENTION

The present invention relates generally to a distributed network of hyperlinked documents. More particularly, the present invention relates to an electronic commerce system and method for referencing remote merchant sites or remote commerce sites at a local commerce site, and may be implemented on a distributed network of hyperlinked documents.

One type of distributed network on which the present invention may be implemented is the Internet. The Internet is an international internetwork of networks connecting millions of individual computer networks and computers. The Internet includes computer networks and computers interconnected to one another. Among these computers are client computers (hereinafter "client") and server computers (hereinafter "server"). In the Internet, typically, a client may submit a client request to a server. A client also may submit data to a server. In response to this client request or data from the client, the server transmits data or a server response to the client. Clients and servers typically communicate over a TCP/IP (Transport Control Protocol/Internet Protocol) link using HTTP (HyperText Transport Protocol) messages, such as client requests and server responses. Other protocols besides TCP/IP and HTTP can be used instead for communications between servers and clients.

An HTTP message typically includes a header and a body. The header of an HTTP message typically includes control information of the HTTP message. The control information typically includes a data length entry of the header to correspond with the length of the data of the client request. The control information typically includes a protocol version of the HTTP message. One protocol version of HTTP messages is version 1.1. Another protocol version of HTTP messages is version 1.0.

The body of an HTTP message typically includes data of the HTTP message. The data transmitted from a server to a client may include a page or pages of text and information, such as graphic, video, or sounds, and/or references to pages which include such data. The pages may be written in a standard format, such as HyperText Markup Language (HTML). A website typically is a server which stores and transmits such pages to clients.

A server typically does not keep track of clients between client requests for pages or data directed to the server. The message protocol typically does not keep track of a client's client requests. However, a server can pass an identification code to the client in response to one client request from the client, and, subsequently, can retrieve this identification code from the client in a subsequent client request to that server from that client. One way in which a server can do this is via cookies. The control information of an HTTP message may be made to include a cookie in the client request.

A cookie in a client-server network is a general mechanism which a server (typically via CGI scripts) can use to store and retrieve information on the client side of the connection in a client-server network. A cookie can be a small piece of information sent by a server or a site to store on a client so it can later be read back from that client. This is useful for having the client remember some specific information. Cookies may be used to store a consumer's password and consumer ID for a particular server or site. They may also be used to store preferences of start pages. Both the Microsoft web browser or client and the Netscape browser or client use cookies to create personal start pages.

With the increasing use of the Internet, many services have been developed to provide consumers (potential purchasers) with the ability to shop online to purchase products and services as well as to comparison shop. A merchant, using the Internet, may have a website, through which the merchant may advertise and/or sell his products to consumers. A merchant's website may also be called a remote commerce site. A merchant may join a group of merchants who also have websites, form a virtual shopping mall or a local commerce site with these merchants, and provide information about and/or sell its products to consumers. The virtual shopping mall to which such a merchant belongs to may also be called a local commerce site. The virtual shopping mall or local commerce site would be a website which would allow a consumer to obtain information about and/or purchase products from various merchants all through one website, the virtual shopping mall or local commerce site.

Previous virtual shopping malls or local commerce sites have posed numerous problems for such merchants. For example, a merchant participating in a virtual shopping mall or local commerce site typically had to establish and had to maintain two separate websites: (1) one website, the merchant's "mall website," for consumers who were shopping for the merchant's goods through the virtual shopping mall or local commerce site and (2) another website, the merchant's "direct website," for consumers who were shopping for the merchant's goods not through the virtual shopping mall or local commerce site, but rather directly through the merchant's own website. Also, in previous virtual shopping malls or local commerce sites, a consumer attempting to obtain information about and/or purchase a merchant's products through a virtual shopping mall was typically unable to access on-line shopping services from the merchant's mall website in the quality and form that were very close to those directly accessible from the merchant's direct website. For example, the consumer was typically unable to obtain real-time up-to-date price and inventory information from the merchant's mall website, as opposed to the merchant's direct website. In addition, in previous virtual shopping malls or local commerce sites, a consumer typically had to interact with a merchant's mall website through an unintegrated and non-uniform interface. Also, in previous virtual shopping malls or local commerce sites, a consumer was typically unable to make use of value-added services offered by the virtual shopping mall or local commerce site, such as a shopping list, a gift registry, or a gift certificate that was redeemable at all the merchant websites participating in the virtual shopping mall.

For the foregoing reasons, it is seen that a technique for referencing remote commerce sites at a local commerce site is highly desirable.

SUMMARY OF THE INVENTION

According to the present invention, an electronic commerce method and system for referencing remote merchant sites at a local commerce site is provided. In an exemplary embodiment, the present invention provides a method for referencing remote commerce sites at a local commerce site. The local commerce site may also be a remote merchant integration server (RMIS). The remote commerce site may also be a remote merchant site. The remote merchant site may be a website of a merchant. The method can be implemented on an individual computer or a network of computers. The network of computers can be a local area network, a wide area network, an intranet, an extranet, an internet, or the Internet. Merely by way of example, the invention is illustrated using the Internet, but it is recognized that the invention can also be applied to personal computers, a local area network, a wide area network, an intranet, an extranet, and an internet.

In an embodiment of the present invention, the electronic commerce method and system for referencing remote merchant sites at a local commerce site includes the following: session managing a client request from a user client and a cookie stripped merchant response, where the session managing includes generating a processed remote merchant integration server (RMIS) response related to a merchant cookie and to the cookie stripped merchant response; traffic relaying the client request and a content transformed merchant response, where the traffic relaying includes generating a processed client request related to the client request, removing the merchant cookie from the content transformed merchant response, and generating the cookie stripped merchant response related to the content transformed merchant response; service integrating the processed client request; and content transforming a merchant response from the remote merchant site, where the content transforming includes generating the content transformed merchant response related to the merchant response.

In a specific embodiment, the session managing includes the following: receiving the client request directed to the remote merchant site from the user client; identifying from the client request if the user client is a first-time visitor to the local commerce site; setting a client cookie for the user client if the user client is a first-time visitor to the local commerce site, where the client cookie includes a unique identification code identifying the user client to the local commerce site; and retrieving from a cookie database a retrieved cookie associated with the user client and the remote merchant site, if the user client is not a first-time visitor to the local commerce site.

In a specific embodiment, the traffic relaying includes generating the processed client request related to the client request and sending the processed client request to the remote merchant site if the processed client request meets certain criteria. In a specific embodiment, the service integrating includes intercepting the processed client request if the processed client request meets certain criteria and performing a function corresponding to and in place of the processed client request if the processed client request meets certain criteria.

In a specific embodiment, the content transforming includes receiving the merchant response to the processed client request from the remote merchant site and transforming a reference in the merchant response, where the transforming includes generating the content transformed merchant response. In a specific embodiment, the content transforming includes receiving the merchant response to the processed client request from the remote merchant site and updating the merchant response, where the updating includes generating the content transformed merchant response.

In a specific embodiment, the traffic relaying includes removing the merchant cookie from the content transformed merchant response, where the removing includes generating the cookie stripped merchant response.

In a specific embodiment, the session managing includes the following: storing the merchant cookie in a cookie database in a storage location related to the remote merchant site and to the user client, where the merchant cookie corresponds to the remote merchant site and to the user client; converting the cookie stripped merchant response into the processed RMIS response; and transmitting the processed RMIS response to the user client.

Depending upon the embodiment, one or more of these advantages may be present. These and other advantages are described throughout the present specification and more particularly below. The invention will be better understood by reference to the following detailed description in connection with the following drawings.

DESCRIPTION OF A SPECIFIC EMBODIMENT

According to the present invention, an electronic commerce method and system for referencing remote commerce sites or remote merchant sites at a local commerce site is provided. In an exemplary embodiment, the present invention provides a method and system for referencing remote merchant sites at a local commerce site. The local commerce site may also be a remote merchant integration server (RMIS). The remote commerce site may also be a remote merchant site. The remote merchant site may be a website of a merchant. The method and system can be implemented on an individual computer or a network of computers. The network of computers can be a local area network, a wide area network, an intranet, an extranet, an internet, or the Internet. Merely by way of example the invention is illustrated using the Internet, but it is recognized that the invention can also be applied to personal computers, a local area network, a wide area network, an intranet, an extranet, and an internet.

In the description that follows, the present invention is explained in reference to a specific embodiment that operates on a client-server network using HTTP messages. The network can be an intranet, an extranet, or the Internet. Therefore, the description of a specific embodiment that follows is intended to be illustrative, but not limiting, of the scope of the present invention as set forth in the claims.

Figure 1:
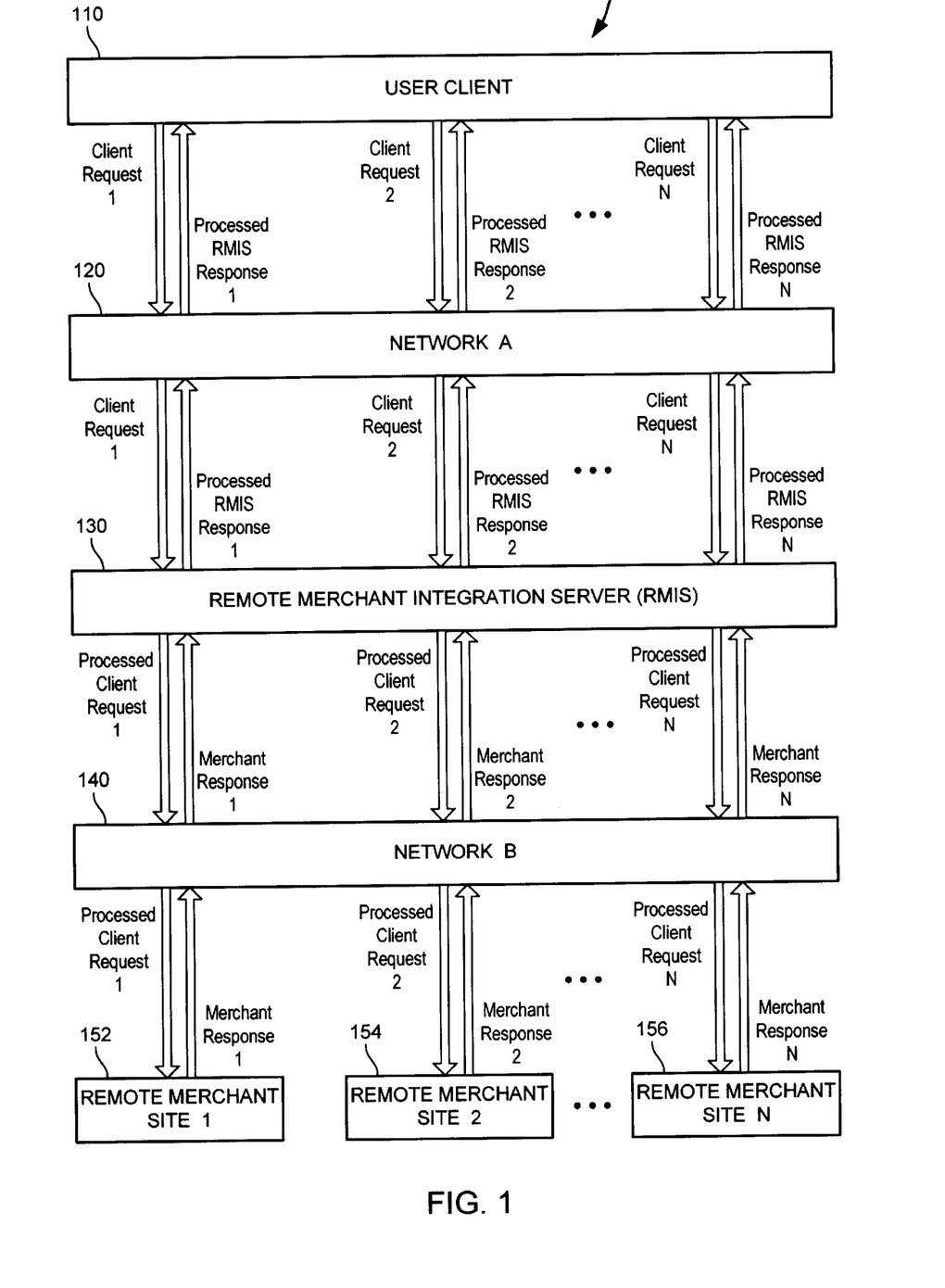
FIG. 1 is a simplified block diagram of a client-server network for referencing remote merchant sites at a local commerce site according to an embodiment of the present invention.

FIG. 1 is a simplified block diagram of a client-server network 100 for referencing remote merchant sites at a local commerce site according to an embodiment of the present invention. The local commerce site may also be a remote merchant integration server (RMIS). This diagram is merely an illustration which should not limit the scope of the claims herein. One of ordinary skill in the art would recognize many other variations, modifications, and alternatives. Client server network 100 has a user client 110, a network A 120, a remote merchant integration server (RMIS) 130, a network B 140, and remote merchant sites 152, 154, 156.

The client server network 100 can be any suitable network such as a wide area network or local area network such as an intranet (e.g., Ethernet, Token Ring) or a combination of a wide and local area network. Client server network 100 can also be a world wide area network (e.g., Internet or internet), which will be described in more detail below.

In an embodiment of the present invention, user client 110 sends a client request (client request 1, client request 2, client request N) to RMIS 130 via network A 120. RMIS 130 is also called the local commerce site. RMIS 130 processes the client request (client request 1, client request 2, client request N) and sends a processed client request (processed client request 1, processed client request 2, processed client request N) to a remote merchant site (remote merchant site 1, remote merchant site 2, remote merchant site N) via network B 140.

In a further embodiment of the present invention, RMIS 130 receives a merchant response (merchant response 1, merchant response 2, merchant response N) from the remote merchant site (remote merchant site 1, remote merchant site 2, remote merchant site N) via network B 140. RMIS 130 processes and sends a processed RMIS response (processed RMIS response 1, processed RMIS response 2, processed RMIS response N) to user client 110, via network A 120.

Figure 2:
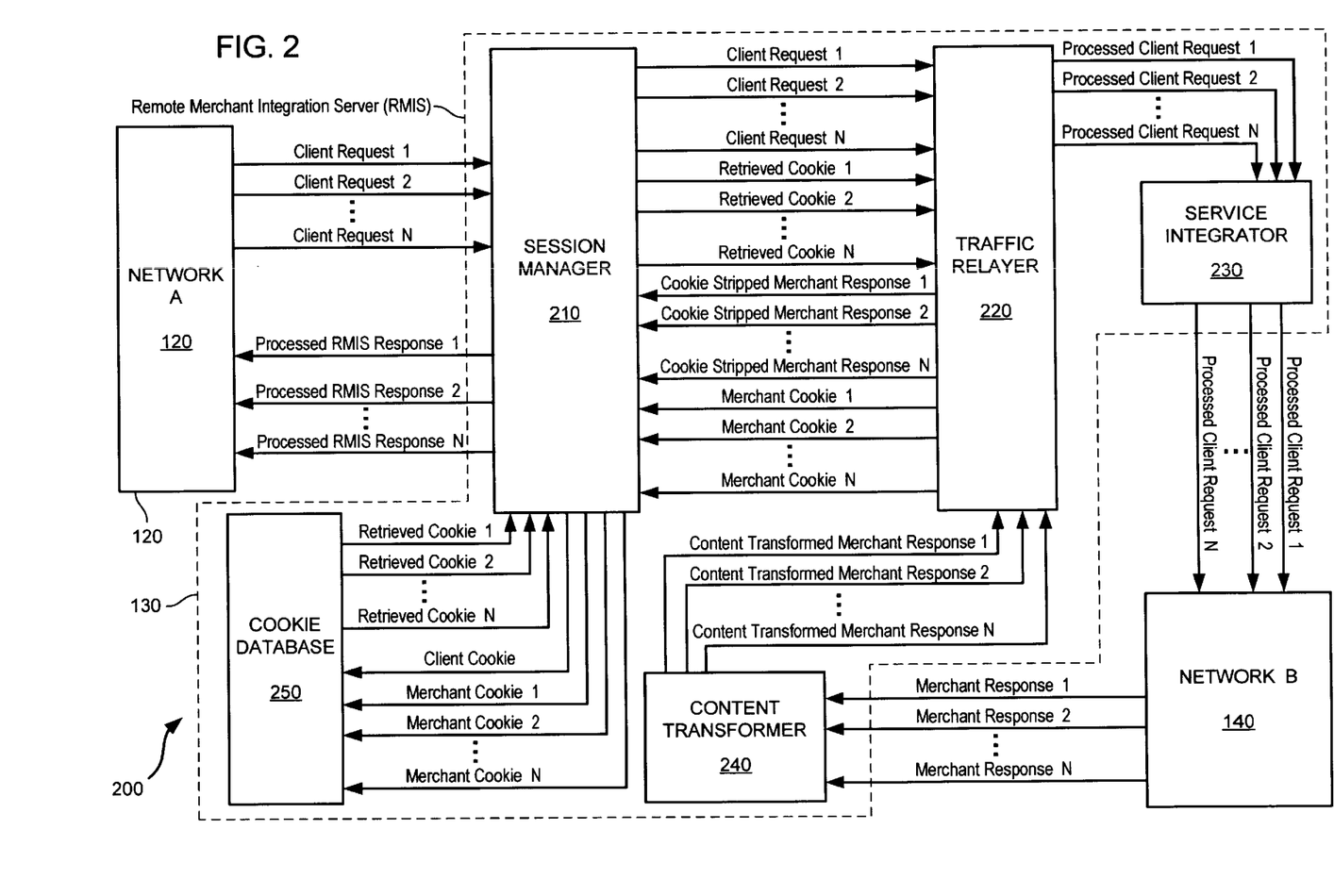
FIG. 2 is a simplified block diagram of a remote merchant integration server (RMIS) according to an embodiment of the present invention.

FIG. 2 is a simplified block diagram of a remote merchant integration server (RMIS) 130 according to an embodiment of the present invention This diagram is merely an illustration which should not limit the scope of the claims herein. One of ordinary skill in the art would recognize many other variations, modifications, and alternatives. Remote merchant integration server (RMIS) 130 has a session manager 210, a traffic relayer 220, a service integrator 230, and a content transformer 240. Remote integration server 200 may also have a cookie database 250.

In an embodiment of the present invention, session manager 210 session manages a client request from user client 110 and a cookie stripped merchant response, where the session managing includes generating a processed RMIS response related to a merchant cookie and to the cookie stripped merchant response. Traffic relayer 220 traffic relays the client request and a content transformed merchant response, where the traffic relaying includes generating a processed client request related to the client request, removing the merchant cookie from the content transformed merchant response, and generating the cookie stripped merchant response related to the content transformed merchant response. Service integrator 230 service integrates the processed client request. Content transformer 240 content transforms a merchant response from the remote merchant site, where the content transforming includes generating the content transformed merchant response related to the merchant response.

Session Managing a Request

In an embodiment of the present invention, session manager 210 performs several tasks. In a specific embodiment, session manager 210 receives the client request (client request 1, client request 2, client request N) directed to the remote merchant site (remote merchant site 1, remote merchant site 2, remote merchant site N) from user client 110 via network A 120. In a specific embodiment, session manager 210 identifies from the client request if the user client is a first-time visitor to the local commerce site, RMIS 130. In a further embodiment, in identifying if the user client is a first time visitor to the local commerce site, session manager 210 determines if the client request includes a client cookie.

In a specific embodiment, session manager 210 sets a client cookie for user client 110 if the user client is a first-time visitor to the local commerce site, where the client cookie includes a unique identification code identifying the user client to the local commerce site. In a further embodiment, when setting the client cookie, the session managers stores the client cookie in cookie database 250 in a storage location related to the user client. In a further embodiment, when setting the client cookie, the session manager sends the client cookie to user client 110. In a further embodiment, user client 110 stores the client cookie in a storage location related to the remote merchant integration server (RMIS) 130.

Alternatively, in a specific embodiment, the session manager retrieves from a cookie database 250 a retrieved cookie associated with the user client and the remote merchant site, if the user client is not a first-time visitor to the local commerce site. In a further embodiment, in retrieving the retrieved cookie, session manager 210 uses the client cookie in the client request to locate the retrieved cookie in the cookie database. In a further embodiment, the retrieved cookie includes a cookie previously sent by the remote merchant site to the local commerce site, where the retrieved cookie relates to user client 110 and to the remote merchant site.

Traffic Relaying a Request

In an embodiment of the present invention, traffic relayer 220 performs several tasks. In a specific embodiment, traffic relayer 220 receives the client request (client request 1, client request 2, client request N) directed to the remote merchant site from user client 110 via network A 120. In a specific embodiment, the traffic relayer generates the processed client request related to the client request ( client request 1, client request 2, client request N). In a specific embodiment, traffic relayer 220 sends the processed client request to the remote merchant site via network B 140 if the processed client request meets certain criteria. In a further embodiment, the certain criteria is determined by user client 110. In a further embodiment, the certain criteria is determined by remote merchant integration server 130. In a further embodiment, the certain criteria is determined by a remote merchant site.

In a specific embodiment, in generating the processed client request, traffic relayer 220 equates the processed client request with the client request if user client 110 is a first-time visitor to the local commerce site. In specific embodiment, in generating the processed client request, traffic relayer 220 adds a retrieved cookie to the client request if the user client is not a first-time visitor to the local commerce site, where the retrieved cookie is associated with the user client and the remote merchant site. In a specific embodiment, in generating the processed client request, traffic relayer 220 registers user client 110 with the remote merchant site if the user client is a first-time visitor to the remote merchant site. In specific embodiment, in generating the processed client request, traffic relayer 220 logs-in user client 110 with the remote merchant site if the user client is not a first-time visitor to the remote merchant site, or if the user client is a first-time visitor to the remote merchant site and has been registered by the local commerce site with the remote merchant site.

In a specific embodiment, in generating the processed client request, traffic relayer 220 changes the header of the client request. In a specific embodiment, in changing the header of the client request, traffic relayer 220 changes a data length entry of the header to correspond with a length of the data of the client request. In a specific embodiment, in changing the header of the client request, traffic relayer 220 changes a protocol version of the header to a standard protocol version. In a further embodiment, in changing the protocol version of the header to a standard protocol version, traffic relayer 220 changes the protocol version of the header from HTTP protocol version 1.1 to HTTP protocol version 1.0. In a further embodiment, in changing the protocol version of the header to a standard protocol version, traffic relayer 220 changes the protocol version of the header to HTTP protocol version 1.0. In a specific embodiment, in changing the header of the client request, traffic relayer 220 changes a cookie in the client request. In a further embodiment, in changing the cookie in the client request, traffic relayer 220 changes the value of the cookie in the client request. In a further in changing the value of the cookie in the client request, traffic relayer 220 replaces the client cookie in the client request with the retrieved cookie, where the retrieved cookie is associated with the user client and the remote merchant site.

Service Integrating a Request

In an embodiment of the present invention, service integrator 230 performs several tasks. In a specific embodiment, service integrator 230 intercepts the processed client request if the processed client request meets certain criteria and performs a function corresponding to and in place of the processed client request if the processed client request meets certain criteria. In a specific embodiment, service integrator 230 retrieves the certain criteria from a certain criteria database within remote merchant integration server (RMIS) 130. In a further embodiment, the certain criteria is determined by user client 110. In a further embodiment, the certain criteria is determined by remote merchant integration server 130. In a further embodiment, the certain criteria is determined by a remote merchant site.

In a further embodiment, the certain criteria is a pattern unique to said remote merchant site. In a further embodiment, the certain criteria is a command within the processed client request to add a product to a shopping cart database in the remote merchant site. In a further embodiment, the certain criteria is a command within the processed client request to add a product to a gift registry database in the remote merchant site. In a further embodiment, the certain criteria is a command within the processed client request to create a gift certificate entry in a gift certificate database in the remote merchant site.

In a specific embodiment, in performing the function corresponding to and in place of the processed client request, the service integrator adds a product to a universal shopping cart database in the local commerce site if the processed client request includes a command to add the product to a shopping cart database in the remote merchant site. In a specific embodiment, in performing the function corresponding to and in place of the processed client request, service integrator 230 adds a product to a universal gift registry database in the local commerce site if the processed client request includes a command to add the product to a gift registry database in the remote merchant site. In specific embodiment, in performing the function corresponding to and in place of the processed client request, the service integrator creates a universal gift certificate entry in a universal gift certificate database in the local commerce site if the processed client request includes a command to create a gift certificate entry in a gift certificate database in the remote merchant site.

Content Transforming a Response

In an embodiment of the present invention, content transformer 240 performs several tasks. For example, in an embodiment of the present invention, the content transformer receives the merchant response to the processed client request from the remote merchant site via network B 140. In a specific embodiment, content transformer 240 transforms a reference in the merchant response, where the transforming includes generating the content transformed merchant response. In a specific embodiment, content transformer 240 updates the merchant response, where the updating includes generating the content transformed merchant response. In a specific embodiment, content transformer 240 receives the merchant response to the processed client request from the remote merchant site via network B 140, transforms a reference in the merchant response, and updates the merchant response, where the transforming and the updating includes generating the content transformed merchant response.

Transforming a Reference Normalizing

In a specific embodiment, in transforming the reference in the merchant response, content transformer 240 normalizes the reference into an absolute form, where the normalizing includes appending an uniform resource locator (URL) of the remote merchant site to the reference if the reference is a relative reference. For example, for a bookstore with a remote merchant site http://www.bookstore.com and for a relative reference such as first/book/html at the bookstore's remote merchant site at URL http://www.bookstore.com/searcb/result, content transformer 240 normalizes this relative reference to http://www.bookstore.com/search/result/first/book.html.

Transforming

In a specific embodiment, content transformer 240 transforms all of the references in the merchant response. In another embodiment, the content transformer does not transform all of the references in the merchant response. For example, a reference to an image of a product at a merchant site may remain in its original form after content transformer 240 has normalized the reference to the image.

In another embodiment, in transforming the reference in the merchant response, content transformer 240 appends the URL of the local commerce site to one of (a) an URL in the merchant response, (b) a location header in the merchant response, (c) a BASE tag in the merchant response, (d) a LINK tag in the merchant response, and (e) a FRAME tag in the merchant response. For example, if a product page on the remote merchant site of the above bookstore contained an URL http://www.bookstore.com/another/book and if the URL of remote merchant integration server 130 were http://rmis.mall.com, content transformer 240 would transform this URL to: http://rmis.mall.com/rmis?url=http://www.bookstore.com/another/book. In a specific embodiment, in transforming the reference in the merchant response, content transformer 240 ensures that a future client request from user client 110 for the reference is processed directly by the local commerce site, or remote merchant integration server 130, such as http://rmis.mall.com, instead of by the remote merchant site, http://www.bookstore.com. In another embodiment, in transforming the reference in the merchant response, content transformer 240 encodes all data in a merchant response from a remote merchant site in the resulting content transformed merchant response, where the data is required by the local commerce site, or remote merchant integration server, to generate, on behalf of user client 110, a processed client request from user client 110 to the remote merchant site.

Updating a Merchant Response

In a specific embodiment, in updating the merchant response, content transformer 240 inserts data into the merchant response, where the data is related to the local commerce site. In a further embodiment, the data includes one of (1) a logo of the local commerce site and (2) a link to a service offered by the local commerce site.

Traffic Relaying a Response

In addition, traffic relayer 220 removes the merchant cookie from the content transformed merchant response, where the removing includes generating the cookie stripped merchant response. In a specific embodiment, traffic relayer 220 removes all merchant cookies from the content transformed merchant response. In a specific embodiment, traffic relayer 220 removes certain merchant cookies from the content transformed merchant response. In a specific embodiment, traffic relayer 220 removes merchant cookies which meet certain criteria. In a specific embodiment, the criteria is determined by user client 110. In a specific embodiment, the criteria is determined by remote merchant integration server 130. In a specific embodiment, the criteria is determined by a remote merchant site.

Session Managing a Response

In addition, session manager 210 stores the merchant cookie in cookie database 250 in a storage location related to the remote merchant site and to the user client, where the merchant cookie corresponds to the remote merchant site and to user client 110. The session manager converts the cookie stripped merchant response into the processed RMIS response. Also, session manager 210 transmits the processed RMIS response to user client 110 via network A 120. In a specific embodiment, when converting the cookie stripped merchant response, session manager 210 equates the processed RMIS response with the cookie stripped merchant response.

Figure 3:
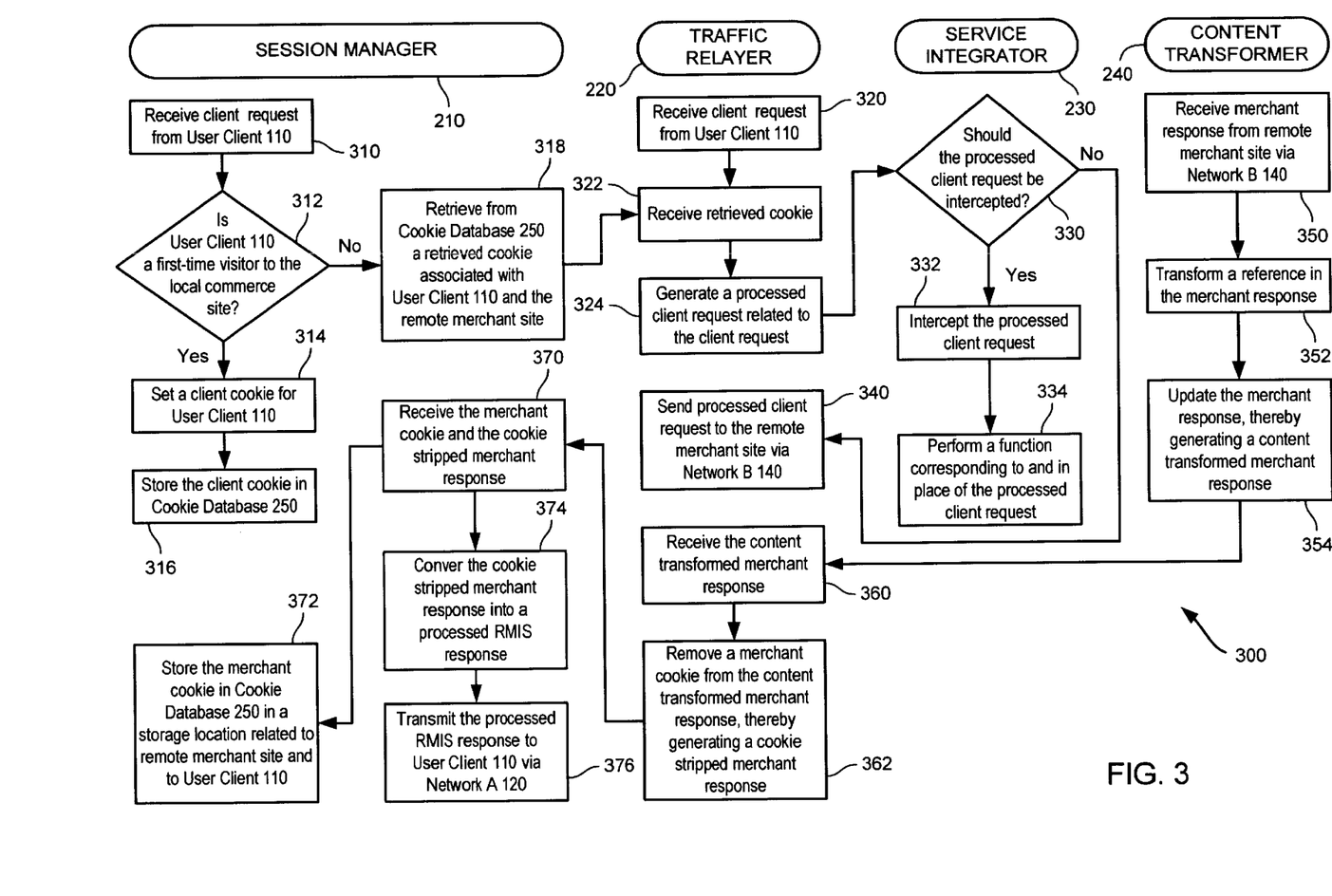
FIG. 3 is a flowchart of the electronic commerce method and system according to an embodiment of the present invention.

FIG. 3 is a flowchart of the electronic commerce method and system according to the present invention. This diagram is merely an example and should not limit the scope of the claims herein. One of ordinary skill in the art would recognize other variations, modifications, and alternatives.

Session Managing a Request

In step 310, session manager 210 receives a client request (client request 1, client request 2, client request N) directed to the remote merchant site from user client 110 via network A 120. In step 312, the session manager identifies from the client request if the user client is a first-time visitor to the local commerce site. In step 314, session manager 210 sets a client cookie for user client 110 if the user client is a first-time visitor to the local commerce site, where the client cookie includes a unique identification code identifying the user client to the local commerce site. If the user client is a first-time visitor to the local commerce site, in step 316, session manager 210 stores this client cookie in cookie database 250. Otherwise, in step 318, session manager 210 retrieves from cookie database 250 a retrieved cookie associated with the user client and the remote merchant site, if the user client is not a first-time visitor to the local commerce site.

Traffic Relaying a Request

In step 320, traffic relayer 220 receives a client request (client request 1, client request 2, client request N) from user client 110 via network A 120. In step 322, traffic relayer 220 receives the retrieved cookie from session manager 210. Next, in step 324, the traffic relayer generates a processed client request related to the client request.

Service Integrating a Request

In step 330, service integrator 230 determines if the processed client request should be intercepted from traffic relayer 220 based upon certain criteria. In step 332, the service integrator intercepts the processed client request if the processed client request meets certain criteria. In step 334, service integrator 230 performs a function corresponding to and in place of the processed client request if the processed client request meets certain criteria. In a specific embodiment, the certain criteria is determined by user client 110. In a specific embodiment, the certain criteria is determined by remote merchant integration server 130. In a specific embodiment, the certain criteria is determined by a remote merchant site.

Traffic Relaying a Request

In step 340, traffic relayer 220 sends the processed client request to the remote merchant site (remote merchant site 1, remote merchant site 2, remote merchant site N) via network B 140, if the processed client request meets certain criteria. In a specific embodiment, the certain criteria is determined by user client 110. In a specific embodiment, the certain criteria is determined by remote merchant integration server 130. In a specific embodiment, the certain criteria is determined by a remote merchant site.

Content Transforming a Response

In step 350, reference transformer 240 receives a merchant response to the processed client request from the remote merchant site (remote merchant site 1, remote merchant site 2, remote merchant site N) via network B 140. In step 352, content transformer 240 transforms a reference in the merchant response, where the transforming includes generating a content transformed merchant response. In step 354, content transformer 240 updates the merchant response, where the updating includes generating a content transformed merchant response.

Traffic Relaying a Response

In step 360, traffic relayer 220 receives the content transformed merchant response from content transformer 240. In step 362, the traffic relayer removes a merchant cookie from the content transformed merchant response, where the removing includes generating a cookie stripped merchant response.

Session Managing a Response

In step 370, session manager 210 receives the merchant cookie and the cookie stripped merchant response from traffic relayer 220. In step 372, the session manager stores the merchant cookie in cookie database 250 in a storage location related to the remote merchant site and to user client 110, where the merchant cookie corresponds to the remote merchant site and user client 110. In step 374, session manager 210 converts the cookie stripped merchant response into a processed RMIS response. In step 386, the session manager transmits the processed RMIS response to user client 110 via network A 120.

Figure 4:
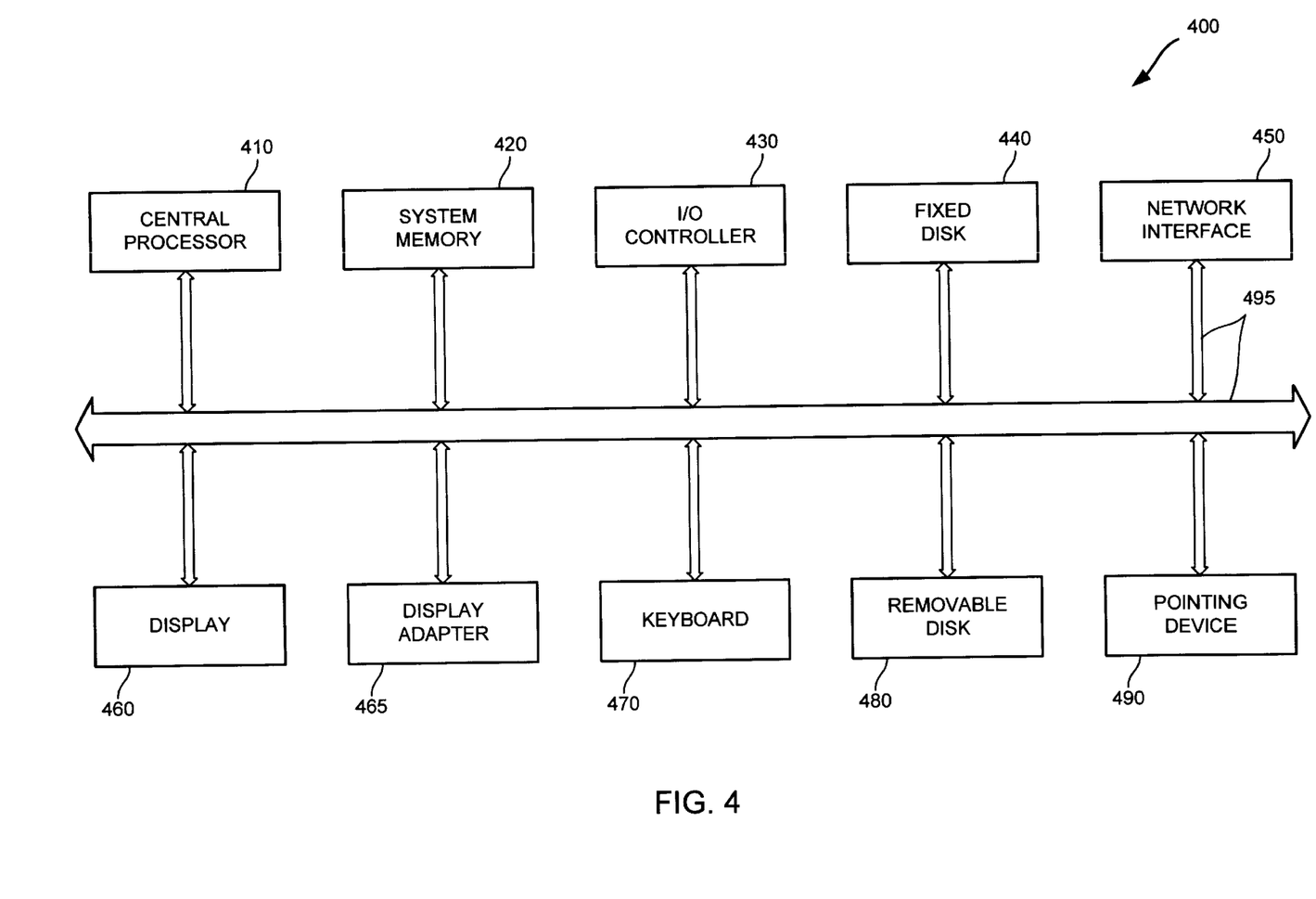
FIG. 4 illustrates a simplified system block diagram of a computer system used to execute the software of the remote merchant integration server (RMIS) according to an embodiment of the present invention.

FIG. 4 illustrates a simplified system block diagram of a computer system 400 used to execute the software of the remote merchant integration server (RMIS) 130 according to an embodiment of the present invention. This diagram is merely an example and should not limit the scope of the claims herein. One of ordinary skill in the art would recognize other variations, modifications, and alternatives. Computer system 400 includes subsystems such as a central processor 410, a system memory 420, an I/O controller 430, a fixed disk 440, and a network interface 450. Computer system 400 may also include a display 460, a display adapter 465, a keyboard 470, a removable disk 480, and a pointing device 490. Other computer systems suitable for use with the present invention may include additional or fewer subsystems. For example, another computer system could include more than one processor 410 (i.e., a multi-processor system) or a cache memory as part of system memory 420.

Arrows such as 495 represent the system bus architecture of computer system 400. However, these arrows are illustrative of any interconnection scheme serving to link the subsystems. For example, a local bus could be utilized to connect central processor 410 to system memory 420 and to display adapter 465. Computer system 400 is but an example of a computer system suitable for use with the present invention. Other configurations of subsystems suitable for use with the present invention will be readily apparent to one of ordinary skill in the art.

In an embodiment of the present invention, computer system 400 may also be used to execute the software of user client 110. In another embodiment of the present invention, computer system 400 may also be used to execute the software of a remote merchant site, remote merchant site 152, remote merchant site 154, remote merchant site 156.

Figure 5:
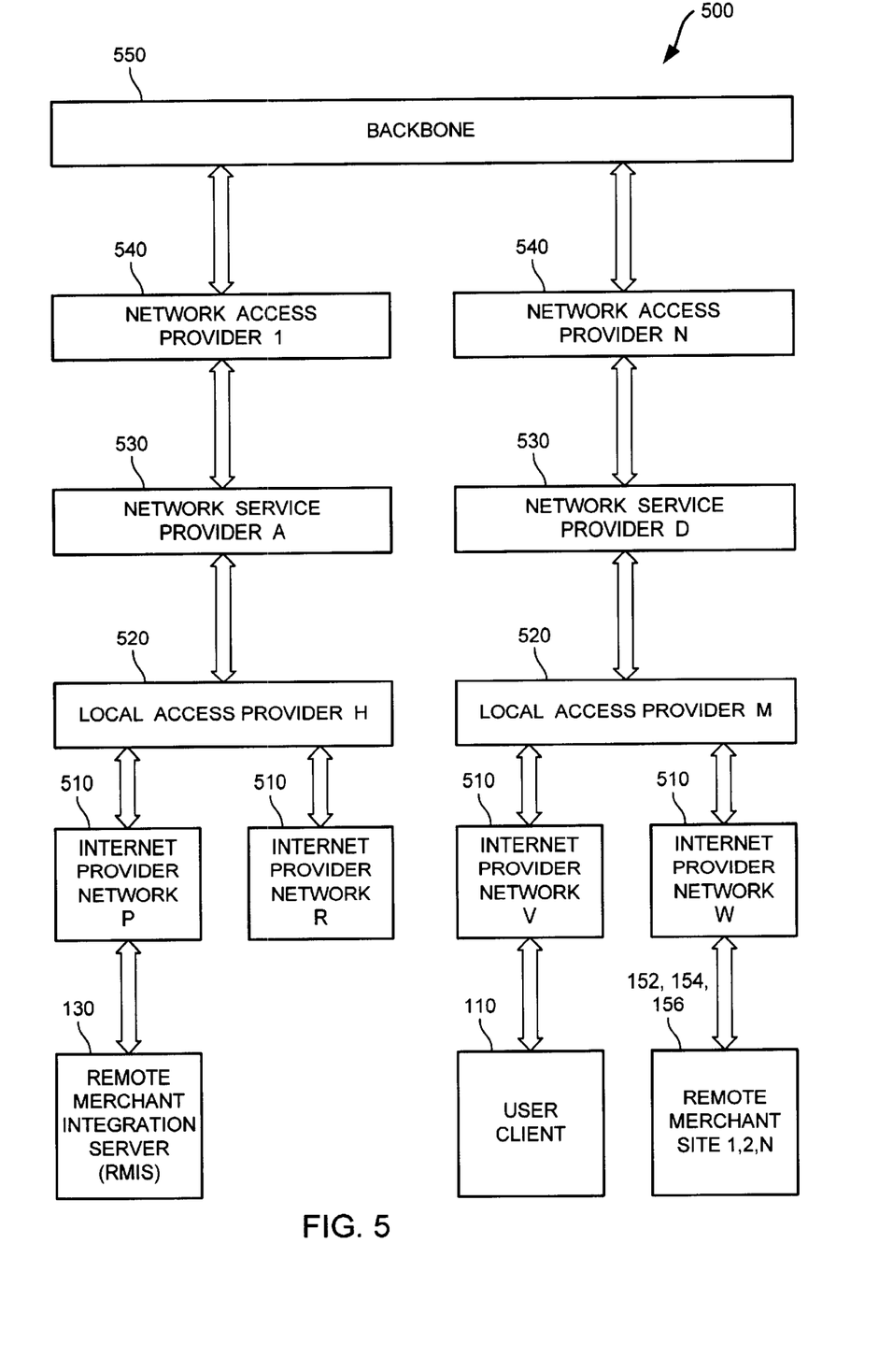
FIG. 5 is a simplified block diagram of the Internet to which a user client, a remote merchant integration server (RMIS), and remote merchant sites, can attach, according to an embodiment of the present invention.

FIG. 5 is a simplified block diagram of the Internet 500 to which a user client 110, a remote merchant integration server (RMIS) 130, and remote merchant sites 1–N, 152–156, can attach, according to an embodiment of the present invention. This diagram is merely an illustration which should not limit the scope of the claims herein. One of ordinary skill in the art would recognize many other variations, modifications, and alternatives. In the example shown, a number of Internet provider networks 510 provide connection to local access providers 520, which then provide access to network service providers 530. The network service providers then connect to network access providers 540, which, in turn, are connected to a backbone service 550. It should be understood that other configurations of the Internet or other networks could be used with the present invention.

Although the above has been described in terms of specific software and hardware, other variations can exist. For example, functionality described above can be further integrated or separated using software. The functionality can also be combined with hardware. A combination of hardware and software can be used. Accordingly, the present invention is not to be limited by specific embodiments noted above.

The invention has been explained with reference to a specific embodiment. Other embodiments will be apparent to those of ordinary skill in the art. It is therefore not intended that this invention be limited, except as indicated by the appended claims.

What is claimed is:

1. A method for referencing a remote merchant site at a local commerce site, comprising:

session managing a client request from a user client and a cookie stripped merchant response, wherein said session managing comprises generating a processed remote merchant integration server (RMIS) response related to a merchant cookie and to said cookie stripped merchant response;

traffic relaying said client request and a content transformed merchant response, wherein said traffic relaying comprises generating a processed client request related to said client request, removing said merchant cookie from said content transformed merchant response, and generating said cookie stripped merchant response related to said content transformed merchant response;

service integrating said processed client request; and content transforming a merchant response from said remote merchant site, wherein said content transforming comprises generating said content transformed merchant response related to said merchant response.

2. The method of claim 1 wherein said session managing comprises:

receiving said client request directed to said remote merchant site from said user client;

identifying from said client request if said user client is a first-time visitor to said local commerce site;

setting a client cookie for said user client if said user client is a first-time visitor to said local commerce site, wherein said client cookie comprises a unique identification code identifying said user client to said local commerce site; and retrieving from a cookie database a retrieved cookie associated with said user client and said remote merchant site, if said user client is not a first-time visitor to said local commerce site.

3. The method of claim 1 wherein said session managing comprises:

storing said merchant cookie in said cookie database in a storage location related to said remote merchant site and to said user client, wherein said merchant cookie corresponds to said remote merchant site and to said user client;

converting said cookie stripped merchant response into said processed RMIS response; and transmitting said processed RMIS response to said user client.

4. The method of claim 2 wherein said setting comprises storing said client cookie in said cookie database in a storage location related to said user client.

5. The method of claim 1 wherein said traffic relaying comprises:

generating said processed client request related to said client request; and sending said processed client request to said remote merchant site if said processed client request meets certain criteria.

6. The method of claim 1 wherein said traffic relaying comprises removing said merchant cookie from said content transformed merchant response, wherein said removing comprises generating said cookie stripped merchant response.

7. The method of claim 1 wherein said service integrating comprises:

intercepting said processed client request if said processed client request meets certain criteria; and performing a function corresponding to and in place of said processed client request if said processed client request meets certain criteria.

8. The method of claim 1 wherein said content transforming comprises:

receiving said merchant response to said processed client request from said remote merchant site; and transforming a reference in said merchant response, wherein said transforming comprises generating said content transformed merchant response.

9. The method of claim 1 wherein said content transforming comprises:

receiving said merchant response to said processed client request from said remote merchant site; and updating said merchant response, wherein said updating comprises generating said content transformed merchant response.

10. The method of claim 1 wherein said content transforming comprises:

receiving said merchant response to said processed client request from said remote merchant site;

transforming a reference in said merchant response; and updating said merchant response, wherein said transforming and said updating comprise generating said content transformed merchant response.

11. A system for referencing a remote merchant site at a local commerce site, comprising:

a session managing module configured to session manage a client request from a user client and a cookie stripped merchant response, wherein said session managing module comprises a generating module configured to generate a processed remote merchant integration server (RMIS) response related to a merchant cookie and to said cookie stripped merchant response;

a traffic relaying module configured to traffic relay said client request and a content transformed merchant response, wherein said traffic relaying module comprises a generating module configured to generate a processed client request related to said client request, a removing module configured to remove said merchant cookie from said content transformed merchant response, and a generating module configure to generate said cookie stripped merchant response related to said content transformed merchant response;

a service integrating module configured to service integrate said processed client request; and a content transforming module configured to content transform a merchant response from said remote merchant site, wherein said content transforming module comprises a generating module configured to generate said content transformed merchant response related to said merchant response.

12. The system of claim 11 wherein said session managing module comprises:

a receiving module configured to receive said client request directed to said remote merchant site from said user client;

an identifying module configured to identify from said client request if said user client is a first-time visitor to said local commerce site;

a setting module configured to set a client cookie for said user client if said user client is a first-time visitor to said local commerce site, wherein said client cookie comprises a unique identification code identifying said user client to said local commerce site; and a retrieving module configured to retrieve from a cookie database a retrieved cookie associated with said user client and said remote merchant site, if said user client is not a first-time visitor to said local commerce site.

13. The system of claim 11 wherein said session managing comprises:

a storing module configured to store said merchant cookie in said cookie database in a storage location related to said remote merchant site and to said user client, wherein said merchant cookie corresponds to said remote merchant site and to said user client;

a converting module configured to convert said cookie stripped merchant response into said processed RMIS response; and a transmitting module configured to transmit said processed RMIS response to said user client.

14. The system of claim 12 wherein said setting module comprises a storing module configured to store said client cookie in said cookie database in a storage location related to said user client.

15. The system of claim 11 wherein said traffic relaying module comprises:

a generating module configured to generate said processed client request related to said client request; and a sending module configured to send said processed client request to said remote merchant site if said processed client request meets certain criteria.

16. The system of claim 11 wherein said traffic relaying module comprises a removing module configured to remove said merchant cookie from said content transformed merchant response, wherein said removing module comprises a generating module configured to generate said cookie stripped merchant response.

17. The system of claim 11 wherein said service integrating module comprises:

an intercepting module configured to intercept said processed client request if said processed client request meets certain criteria; and a performing module configured to perform a function corresponding to and in place of said processed client request if said processed client request meets certain criteria.

18. The system of claim 11 wherein said content transforming module comprises:

a receiving module configured to receive said merchant response to said processed client request from said remote merchant site; and a transforming module configured to transform a reference in said merchant response, wherein said transforming module comprises a generating module configured to generate said content transformed merchant response.

19. The system of claim 11 wherein said content transforming module comprises:

a receiving module configured to receive said merchant response to said processed client request from said remote merchant site; and an updating module configured to update said merchant response, wherein said updating module comprises a generating module configured to generate said content transformed merchant response.

20. The system of claim 11 wherein said content transforming module comprises:

a receiving module configured to receive said merchant response to said processed client request from said remote merchant site;

a transforming module configured to transform a reference in said merchant response; and an updating module configured to update said merchant response, wherein said transforming module and said updating module comprise a generating module configured to generate said content transformed merchant response.

* * * * *